W. E. MINUE.
ENGINE.
APPLICATION FILED JUNE 16, 1913.

1,151,602.

Patented Aug. 31, 1915.
2 SHEETS—SHEET 1.

Witnesses.

Inventor.
W. E. Minue

W. E. MINUE.
ENGINE.
APPLICATION FILED JUNE 16, 1913.
1,151,602.
Patented Aug. 31, 1915.
2 SHEETS—SHEET 2.
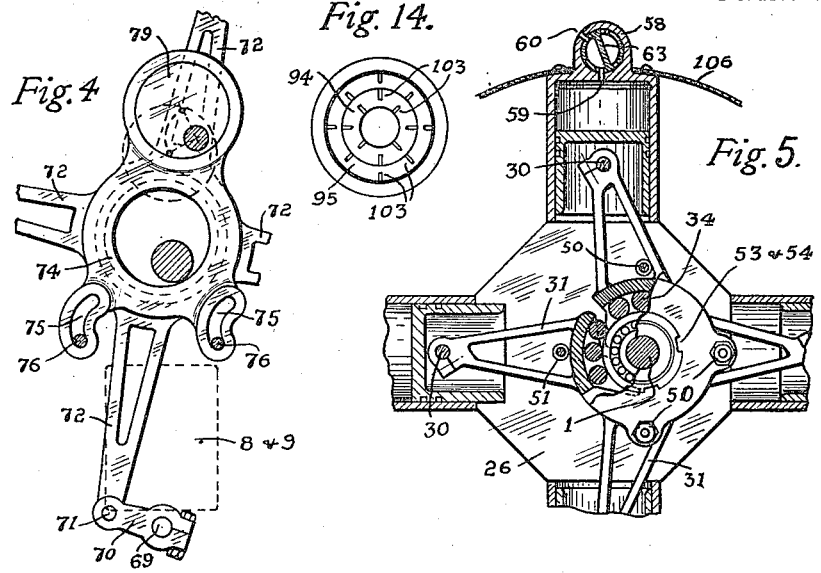
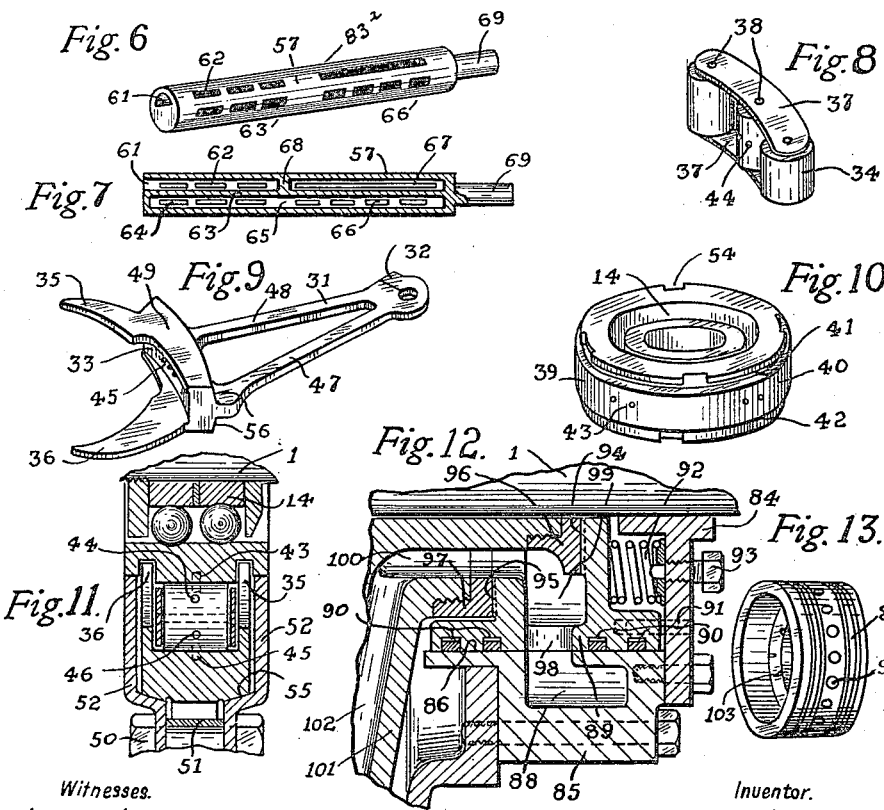
Witnesses.
Inventor.
W. E. Minue

UNITED STATES PATENT OFFICE.

WILLIAM EDGAR MINUE, OF FREDERICTON, NEW BRUNSWICK, CANADA.

ENGINE.

1,151,602.  Specification of Letters Patent.  Patented Aug. 31, 1915.

Application filed June 16, 1913. Serial No. 773,895.

*To all whom it may concern:*

Be it known that I, WILLIAM EDGAR MINUE, a subject of the King of Great Britain, residing at Fredericton, in the Province of New Brunswick, Dominion of Canada, have invented certain new and useful Improvements in Engines, of which the following is the specification.

The invention relates to improvements in engines as described in the following specification and the drawings which form part of the same.

The objects of the invention are to simplify the construction of, and also reduce the friction in, as well as increasing the efficiency of, engines, whether for steam or gas.

The invention consists of the improved and novel construction and arrangement of parts disclosed hereinafter.

The example which I have illustrated in the present specification and drawings showing the adaptation of my invention thereto is a rotary steam engine of the type known as compound, that is having high and low pressure cylinders.

Figure 1:
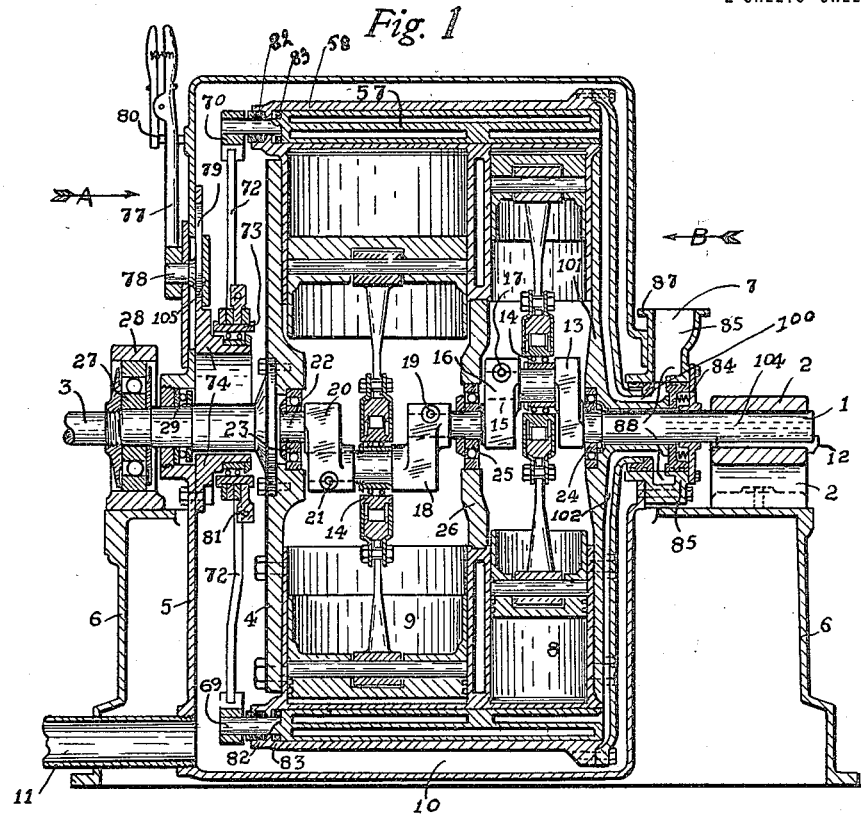
Figure 2:
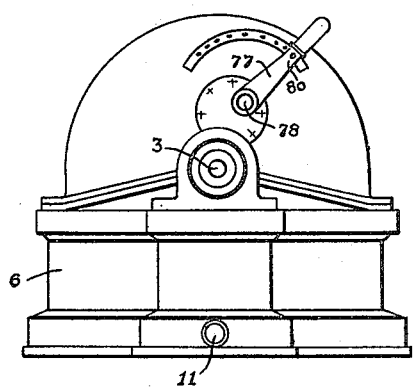
Figure 3:
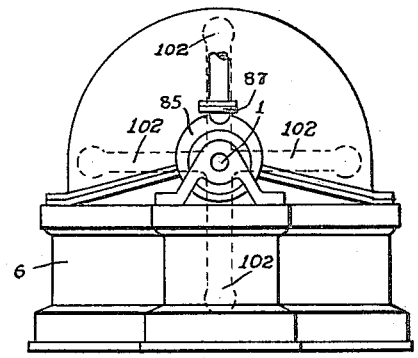

In the drawings, Figure 1 represents a sectional elevation of such an engine. Fig. 2 represents an elevation looking in the direction of the arrow A in Fig. 1, that is looking on the "power" end of the machine. Fig. 3 is an end elevation looking in the direction of the arrow B in Fig. 1 on the "steam" end of the machine. Fig. 4 is an elevation of part of the valve actuating gear showing the adjustable mounting of the inner race of the eccentric ball bearing used to operate the valve gear. Fig. 5 is a part sectional elevation indicating the arrangement of pistons and connecting rods, the connection between them and the stiff crank. Fig. 6 is a perspective view of a suitable valve member. Fig. 7 is a sectional elevation of the valve member. Fig. 8 shows a set of rollers suitable for interposing between the connecting rods and the outer race of the ball bearings secured to the stiff crank. Fig. 9 indicates in perspective the form of connecting rod used in my invention. Fig. 10 indicates the ball race adapted to be used with these connecting rods and rollers. Fig. 11 shows a sectional arrangement in elevation of the ball bearing attached to a stiff crank, also the connecting rod end and claws engaging therewith and the rollers and the housing which secures the connecting rod and rollers to the outer race. Fig. 12 indicates a sectional arrangement in elevation of the gland which is used for transmission of steam from the outer casing to the rotary members. Fig. 13 is a perspective view of the gland and its piston rings which are used for transmission of steam from the outer casing to the rotary members. Fig. 14 is a diagrammatic elevation showing the arrangement of lubricating channels used in the rubbing surfaces of the gland which affords transmission of steam from the fixed to the rotary elements.

In the drawings like numerals of reference indicate corresponding parts in all the figures.

In accordance with the present invention, and referring more particularly to the example which I herein illustrate and describe, a crank shaft 1 is keyed or otherwise fixedly secured to a pedestal 2 and the operation of the engine is produced by the thrust of the pistons against the cranks of this fixed shaft giving a rotary motion to the casing in which a plurality of cylinders with their valve gear are secured. This casing in which the cylinders are is mounted on ball bearings secured at intervals along the fixed crank shaft for the major part of it and at the end of the rotating casing is secured a shaft 3 which is mounted in a journal on the base plate of the machine.

In the engine described, the circular casing 4 which contains the cylinders is incased by a fixed circular casing 5 which is mounted on the base plate 6. The ingoing steam enters by the inlet 7, passes through the passageway 102 to the valve member 57 then through the high pressure cylinders 8 and the low pressure cylinders 9 out into the space 10 between the fixed casing 5 and the rotating casing 4. The exhaust pipe 11 is secured to this outer casing 5.

Referring to the specific construction detailed in the drawings, the shaft 1 is secured by a key 12 to the pedestal 2 and is formed with a crank 13 adapted to receive the ball bearings 14 of the high pressure connecting rod seating, and for the purpose of fitting these ball bearings it is necessary to make the crank in several pieces, thus the arm 15 of the crank is bored to receive the end 16 of the crank pin on which the connecting rod seating is arranged and is keyed thereto in any suitable manner such as by the bolt 17.

18 is another section of the crank which is secured with the previous section by the bolt 19.

20 is the final section of the crank secured to the section 18 by the bolt 21. This section terminates in the pin 22 to which is secured the inner race of the ball bearing 23, one of the bearings which supports the outer casing 4.

24 indicates another journal ball bearing between the crank shaft 1 and the rotating casing 4 and 25 is also a journal bearing seated intermediate of the high and low pressure cranks, whose inner race is secured to the stiff crank and whose outer race is secured to the plate 26 which is in the nature of a supporting washer bolted to the several inner ends of the cylinders and adapted to give them rigidity and act as a seating for the ball race 25.

27 is a journal ball bearing whose inner race is secured to the rotating shaft 3 and whose outer race is secured in the housing 28 which is fixed to the bed plate 6.

29 is a thrust ball bearing taking up any end thrust there may be.

Referring to the connecting rod details, these are illustrated particularly in Figs. 1, 5, 8, 9, 10 and 11.

30 represents the connecting rod pivot which is secured to the piston of either high or low pressure cylinders, and 31 is the connecting rod which is pivotally secured to the pin 30 and is preferably provided with a bush to engage directly with the said pin and a split head 32 arranged to be tightened on this bush and to tighten the bush if need be.

33 represents (Fig. 9) the surface against which the rollers 34 (Fig. 8) engage on the one side. The connecting rod is provided with two "claws" 35 and 36 respectively right and left handed and between which rollers 34 (which are preferably secured together by the plates 37 and the pins 38) are adapted to be loosely fitted. These rollers engage with the outer circumference 39 of the outer race 40 of the ball bearing 14 secured to the stiff crank shaft. This outer race has annular grooves 41 and 42 which are adapted respectively to receive the claws 35 and 36. It will be understood that the inner ball race being secured to the crank shaft will not revolve and that the outer race will revolve at the same speed as the outer casing, and further that there will be a slight play of the connecting rod ends relatively one to the other against this outer race. The purpose of these rollers is to take up that slight play with as little friction as possible. Owing to the very limited nature of this play it has been found desirable to have the rollers 34 in their casing 38 extend nearly the whole way along the bearing surface 33 of the connecting rod, and it has also been found desirable in order to prevent the rollers leaving their proper place between the outer race and the connecting rod to put some small pegs 43 on the outer race adapted to engage with corresponding holes 44 in the center roller only and also pegs 45 on the bearing surface of the connecting rod which engage with corresponding perforations in the middle roller 46, which are not shown in the drawing except in Fig. 11.

The connecting rod is made with two arms 47 and 48 secured a suitable distance apart at the end of the part 49 adjacent to the crank and the play of the connecting rod against the outer housing is also limited by the bolt 50 and distance tube 51 which passes through the clamp plates 52 and also between the arms 47 and 48 as shown in Fig. 5. These clamp plates 52 are adapted to fit over the outside on the extreme edges of the outer race of the bearing 14 and are provided with tongues 53 engaging in notches 54 in this outer race which prevent the plates from moving on the race. These plates have a tapered surface 55 engaging with a corresponding tapered surface 56 on the connecting rod and in the event of any wearing of the roller taking place the distance tube 51 may be shortened and the plates 52 tightened closer together when the tapered surface 55 will take up any slackness between the rollers 34 and the bearing surfaces with which they engage. (See Fig. 11 for the illustration of this.)

The valve gear is one of the novel features of the invention and operates the valve member 57 which is adapted to partially rotate in the ear 58 at the end of the cylinder remote from the connecting rod. This ear has a slot 59 connecting with the inside of the cylinder and is adapted to form a passage for steam or gas entering or leaving the cylinder, and 60 is a slot formed in the outside of the ear and is adapted to be used solely as an exhaust port.

The valve member 57 would be of variable construction, depending on what sort of engine it was intended to be used with as regards the details. The one illustrated is only suitable for the particular type of engine here shown, namely a compound steam engine. It is provided with an opening 61 which is the inlet for high pressure steam and a series of slots 62 which serve to introduce the high pressure steam into the high pressure cylinders.

63 is a wall extending longitudinally the whole length of the valve member and thus forming the chamber 65, which has opening into it the slots 64 which act as exhaust ports from the high pressure cylinder and the steam is conveyed along the compartment 65 in the valve to a plurality of slots 66 which form the inlet port for the low pressure cylinders. A single slot 67 is the low pressure exhaust and in certain positions coincides with the slot 60 (Fig. 5), letting exhaust steam out of the engine to the space 10 between the rotating and fixed casings 4 and 5. A wall 68 is formed between the high pressure inlet 61 and the low pressure exhaust 67 completely shutting off the one from the other.

69 is a stem formed on the valve member which is adapted to form a means of imparting motion to the valve member by having the pivoted crank 70 clamped to it.

71 is a pivot in the end of this crank remote from the pin 69 and the pivot 71 is secured to the combined eccentric strap and arm 72 which is loosely mounted on the outer race 73 of a ball bearing, the adjustable eccentric seating of whose inner member provides the actuating means for the valve member. There are as many of these arms 72 as there are sets of high and low pressure cylinders, one for each set actuating its valve. They may all be loosely mounted on the outer race 73. It will be understood that there is a small amount of travel of these arms 72, one to another when they are rotating, which provides the reason for loosely mounting them all on the outer race, which outer race will of course revolve at the same speed as the engine, while the inner race is adjustably secured to the casing 5. This means of adjustment of the inner race 74 provides the adjustment of power and speed and also of reversing for the engine. The inner race is provided with two slots 75 in the form of a segment which fit pins 76 secured to the outer casing 5 and form a guiding means for the inner race. The actual adjustment is actuated by means of a handle 77 secured to a pin 78 which is eccentrically set in a disk 79. (See Figs. 1 and 4). This handle 77 has a pin clutch arrangement 80 adapted to be secured in various positions. Should it be desired to stop the engine by means other than cutting off steam this adjusting means would hold the inner race 74 intermediate of its two extreme positions, which would cut off power. By moving the race to one side or the other of its central position power is increased in a clockwise or counter-clockwise direction of rotation.

The connecting rods 72 for the valve gear are preferably split at the opposite side to the arm and provided with lugs 81 (Fig. 1) adapted to be clamped together, and if necessary have a packing strip to keep the lugs a suitable distance apart.

The valve member itself is rotatably mounted in the cylinder casing and has a stuffing box 82 with what is known as soft packing engaging the stem 69 of the valve. A thrust ball race 83 is employed to take up any thrust between the valve member and its seating, also a very fine groove 38ª is cut longitudinally right along the surface of the valve on the outside extending from one end to the other to allow of there being steam pressure at both ends to reduce the end thrust of the valve member.

84 indicates a plate which is secured to the stiff crank adjacent to the pedestal 2 in any suitable manner such as by being shrunk or driven on or keyed to the crank shaft 1, and to this is bolted the inlet piece 85 which is constructed having a smooth concentric parallel bore 86 and has on its outside at one side the pipe connecting flange 87 which forms the inlet for the steam.

The steam passage 88 is formed a little eccentrically disposed toward the inner concentric bore, the narrow part of the eccentric being on that side remote from the pipe flange 87.

91 shows pins which are secured to the plate 84 and extend therefrom in a direction parallel to the axis of the stiff crank shaft. These pins enter loosely into orifices in the gland ring 89 thus allowing the gland ring 89 end play, but prevent the possibility of any rotary motion.

92 indicates compression springs which are adjustable by the set screws 93 pressing between the gland ring 89 and the plate 84.

It will be seen that the plate 84, the gland ring 89 and the inlet piece 85 do not under any circumstances revolve; the gland ring is formed with two bearing surfaces 94 and 95 which are adapted to form a seating which will press against corresponding surfaces of the rotating body and whose surfaces engaging with one another will prevent the leakage of steam from the gland. In practice it has been found desirable to provide renewable slippers 96 and 97 on the rotating member such slippers engaging with the surfaces 94 and 95 of the gland.

98 indicates a series of holes in the gland ring which are arranged normally to be in line with the opening 88 in the inlet piece and these holes communicate with an annular opening 99 in the gland ring. A corresponding circular passage 100 is made in the plate 101 (Fig. 1) which forms one end wall of the rotary part. The end wall has cored in it a number of slots 102 as shown in Figs. 1, 3 and 12, extending from this circular steam passage 100 at the center of the plate radially outward, one passage terminating at its outer end opposite each valve member 57 and forming the path for steam to the valves.

It has been found that the piston rings 90 pressing against the surface 86 of the inlet member have produced a very perfect gland. The pressure given by the spring 92 against one end of the rotary part of the engine is taken up at the other end of the rotary part of the engine by the thrust race 29.

In the lubrication of the rubbing surfaces in the inlet gland, the method I adopt is to cut radially disposed slots 103 in these rubbing surfaces of the gland ring, each slot extending as shown in Fig. 14 approximately halfway across the surface in which it is cut, commencing at either the inner or outer edge and a series of slots is cut commencing from both the inner and outer edge, being arranged interleaved with one another so as to provide lubricating channels in reality over the whole of the rubbing surfaces, but yet not making any single continuous cut across the surface which would allow a leakage of steam.

Lubrication of the bearings 14 on this crank shaft is effected by forming the crank shaft with a small central bore 104 and providing openings from this bore which extends right along the various sections of the shaft, such openings forming a means for allowing the lubrication to get at the races 14. A lubricator is secured to the extreme end of the crank shaft for the purpose of supplying the lubrication.

It will be understood that the application of these features is not necessarily limited to rotary steam engines, but many of them might also with advantage be used in rotary internal explosion engines.

105 represents a strap which is secured to the outer casing 5 and which assists in keeping the inner member 74 of the valve gear ball race, also the disk 79 of the adjusting gear for this ball race, in position against the end plate of the fixed casing 5.

As many changes of detail could be made in the above construction and many apparently widely different embodiments of my invention being constructed without departing from the spirit or scope thereof and being within the scope of the claims, it is intended that all matter contained in the accompanying specification and drawings shall be interpreted as illustrative and not in a limiting sense.

It is considered by many engineers an objection to have exhaust steam playing on the exterior surface of the cylinders and for this purpose I arrange a lagging 106 or baffle as shown in Fig. 5, which extends completely around the outside of the cylinders and is formed in sections, each section extending from the ear 58 of one set of cylinders to the corresponding ear on the adjacent set of cylinders and keeping the exhaust steam on the outside of the same, that is on that side remote from the crank shaft.

What I claim as my invention is:

1. In an engine and in combination, a plurality of rotating cylinders, pistons in the cylinders, a fixed crank a ball race on the crank, connecting rods pivoted to the pistons and extending adjacent to the outer periphery of the ball race, rollers between the ball race and the connecting rods, clamping plates on opposite sides of the ball race, said clamping plates being spaced a distance apart.

2. In an engine and in combination, a plurality of rotating cylinders, pistons in the cylinders, a fixed crank, a ball race on the crank, connecting rods pivoted to the pistons and extending adjacent to the outer periphery of the ball race, rollers between the ball race and the connecting rods, clamping plates on opposite sides of the ball race, said clamping plates being spaced a distance apart, and means whereby tightening of the clamping plates will take up any slackness between the rollers.

3. An engine having a steam inlet gland comprising an outer casing with a smooth parallel bore, a sleeve whose outer surface is adapted to engage with said parallel bore, rubbing surfaces on said sleeve, rubbing slippers coöperative therewith, lubricating means for said rubbing surfaces, said means consisting of said surfaces having radially disposed slots commencing alternately from the inner and outer periphery of said rubbing surfaces and extending a distance over said surfaces.

4. In an engine, a rotary element, a steam inlet gland comprising a fixed washer, an outer casing secured to the said washer, a gland sleeve slidably secured in said outer casing and having rubbing surfaces adapted to engage with the rotary element of the engine, compression springs extending between said washer and said gland sleeve adapted to force the said gland sleeve against said rotary elements.

5. In an engine, a rotary element, a stiff shaft, a steam inlet gland comprising a washer secured to the stiff shaft, an outer casing secured to the said washer, a gland sleeve slidably secured in said outer casing and having rubbing surfaces adapted to engage with the rotary element of the engine, compression springs extending between said washer and said gland sleeve adapted to force the said gland sleeve against said rotary elements, means of adjustment for said compression springs comprising adjustable screws mounted in said washer.

In witness whereof I have hereunto set my hand in the presence of two witnesses.

WILLIAM EDGAR MINUE.

Witnesses:
RUSSEL S. SMART,
PEARLE M. GARROW.

Copies of this patent may be obtained for five cents each, by addressing the "Commissioner of Patents, Washington, D. C."